United States Patent
Fortin et al.

(10) Patent No.: US 9,694,734 B2
(45) Date of Patent: Jul. 4, 2017

(54) HINGED CARGO TIE-DOWN CLEAT

(71) Applicant: FORD GLOBAL TECHNOLOGIES, LLC, Dearborn, MI (US)

(72) Inventors: Jeffrey Gerard Fortin, Birmingham, MI (US); Danny John Wilyard, Canton, MI (US); Gary Speck, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/952,453

(22) Filed: Nov. 25, 2015

(65) Prior Publication Data
US 2017/0144581 A1 May 25, 2017

(51) Int. Cl.
*B60P 7/08* (2006.01)
(52) U.S. Cl.
CPC .................... *B60P 7/0807* (2013.01)
(58) Field of Classification Search
CPC .................................................... B60P 7/0807
USPC ............... 410/102, 104–106, 110, 112, 116; 24/265 CD, 115 K; 248/499
See application file for complete search history.

(56) References Cited

U.S. PATENT DOCUMENTS

| | | | | |
|---|---|---|---|---|
| 3,282,229 A | * | 11/1966 | Elsner | B60P 7/0815 410/105 |
| 3,765,063 A | * | 10/1973 | Farley | B60P 7/0815 410/116 |
| 6,000,890 A | | 12/1999 | Macias | |
| 6,113,328 A | * | 9/2000 | Claucherty | B60P 7/0807 410/106 |
| 6,416,265 B1 | | 7/2002 | Flores et al. | |
| 8,794,886 B1 | | 8/2014 | Nett et al. | |

* cited by examiner

*Primary Examiner* — Stephen Gordon
(74) *Attorney, Agent, or Firm* — Jason C. Rogers; Brooks Kushman P.C.

(57) ABSTRACT

A retaining apparatus includes a base member having a backing portion engaging a first side of a fixed plate and a cleat engaging a second side of the fixed plate. A neck portion connects the backing portion to the cleat and slidingly engages a keyway hole in the fixed plate. The retaining apparatus also includes a locking member coupled to the base member by a hinge. The locking member defines a disengaged position spaced from the fixed plate and is pivotable to an engaged position to secure the apparatus to the fixed plate.

5 Claims, 4 Drawing Sheets

US 9,694,734 B2

HINGED CARGO TIE-DOWN CLEAT

TECHNICAL FIELD

The present disclosure relates to removable cargo tie-down structures for vehicle body systems.

BACKGROUND

Various vehicles include a cargo hold, or cargo bed, to transport cargo. The cargo beds may include tie down attachments for securing the cargo during transport. Tie down attachments may be permanently affixed to the cargo bed structure. Permanent attachments may be required to be secured with tools. Such permanent attachments can also be inflexible with respect to the locations available to tie down cargo. Additionally, tie-down attachments can interfere with cargo stored in the cargo bed that is not desired to be tied down using attachments.

This disclosure is directed to solving the above problems and other problems as summarized below.

SUMMARY

According to an aspect of the present disclosure, a retaining apparatus includes a base member having a backing portion engaging a first side of a fixed plate and a cleat engaging a second side of the fixed plate. A neck portion connects the backing portion to the cleat and slidingly engages a keyway hole in the fixed plate. The retaining apparatus also includes a locking member coupled to the base member by a hinge. The locking member defines a disengaged position spaced from the fixed plate and is pivotable to an engaged position to secure the apparatus to the fixed plate.

According to another aspect of the present disclosure, a retaining apparatus includes a base member having a backing portion and a cleat sandwiching an upper portion of a keyway in a fixed plate. The retaining apparatus also includes a locking member coupled by a hinge to the base member to pivot between a disengaged first position spaced from the fixed plate and an engaged second position which engages a lower portion of the keyway to secure the base member in the upper portion of the keyway.

According to a further aspect of the present disclosure, a cargo retention system includes a fixed plate secured to a cargo bed and defining an offset section. The cargo system also includes a retaining apparatus having a base member to slidingly engage the offset section. The retaining apparatus is provided with a locking member coupled to the base member by a hinge. The locking member is pivotable from a disengaged position having clearance to the offset section to an engaged position engaging an edge of a hole in the offset section.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
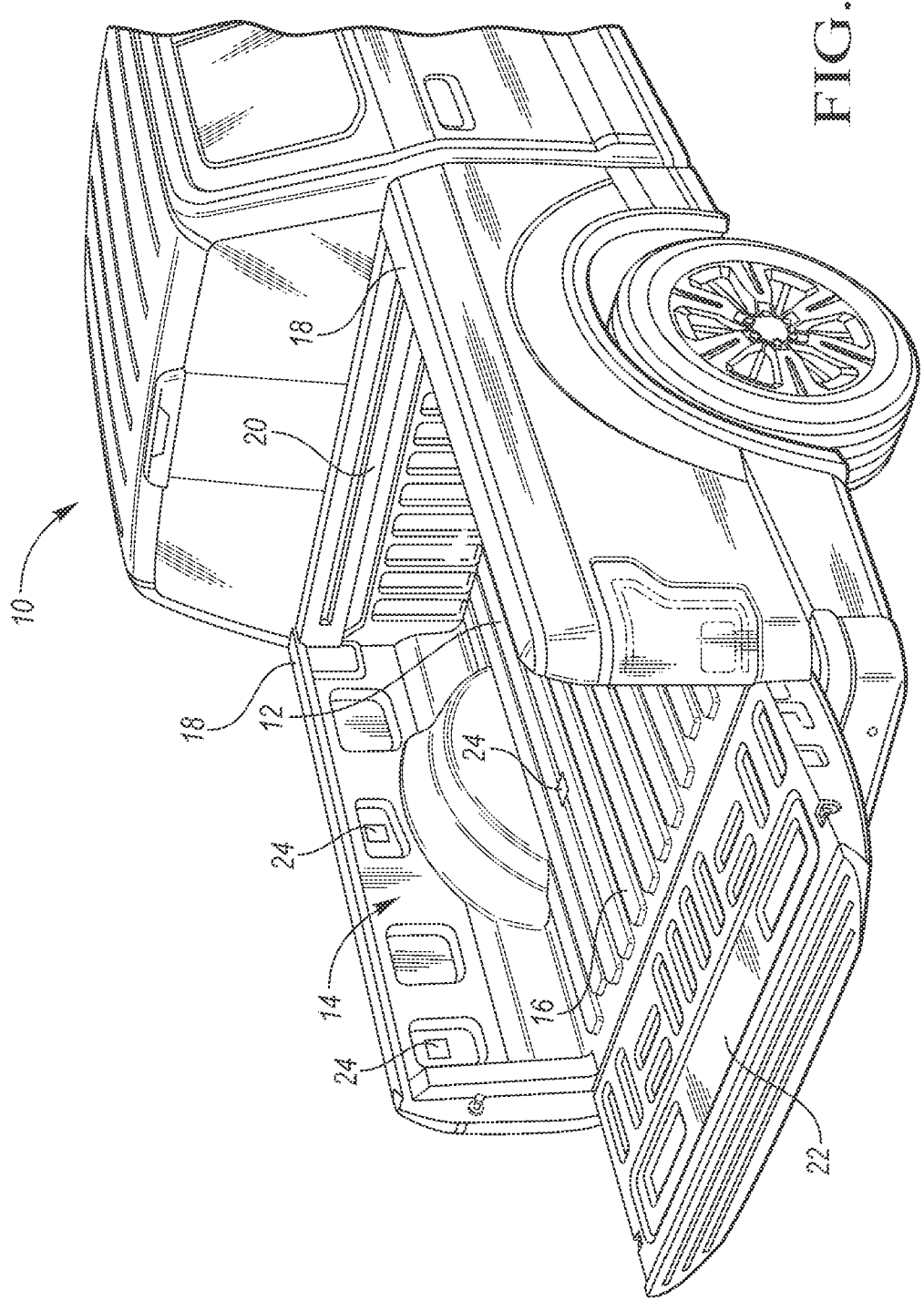
FIG. 1 is a perspective view of a vehicle cargo bed.

Referring to FIG. 1, a vehicle 10 includes a cargo bed 12 having a plurality of panels joined to define a cargo area 14. A floor panel 16 is disposed beneath the cargo area to support cargo items from beneath. A pair of opposing side walls 18 extends vertically from the floor panel 16 to retain cargo laterally within the cargo area. A headboard panel 20 extends vertically from the front edge of the floor panel 16 to retain cargo at a forward portion of the cargo area 14. A pivoting tailgate 22 is attached to the floor panel 16 at a rear portion and is shown in FIG. 1 at an open horizontal position that facilitates placing cargo within the cargo area 14. The tailgate 22 is capable of pivoting upward to be latched in a vertical closed position to retain cargo at the rear portion of the cargo area 14.

The overall size of the cargo area 14 is maximized to enhance the cargo carrying capability of the cargo bed 12 and account for a range of different cargo types. Cargo types which are smaller than the overall size of the cargo area may not occupy the entire space of the cargo area 14. It is undesirable to allow smaller-sized cargo to shift within the cargo bed during transit.

It may be desirable to tie down cargo at different locations within the cargo bed 12 during transit based on the size and shape of the cargo items. A plurality of fixed plates 24 may be affixed to the various panels of the cargo bed 12 to provide a number of different securing points for different types of cargo. In at least one embodiment, standard-sized fixed plates 24 are provided at several locations on one or more of the floor panel 16, side walls 18, headboard panel 20, and tailgate 22. In alternative embodiments, the fixed plate 24 may be an elongate track having a number of different attachment points along its length.

Figure 2:
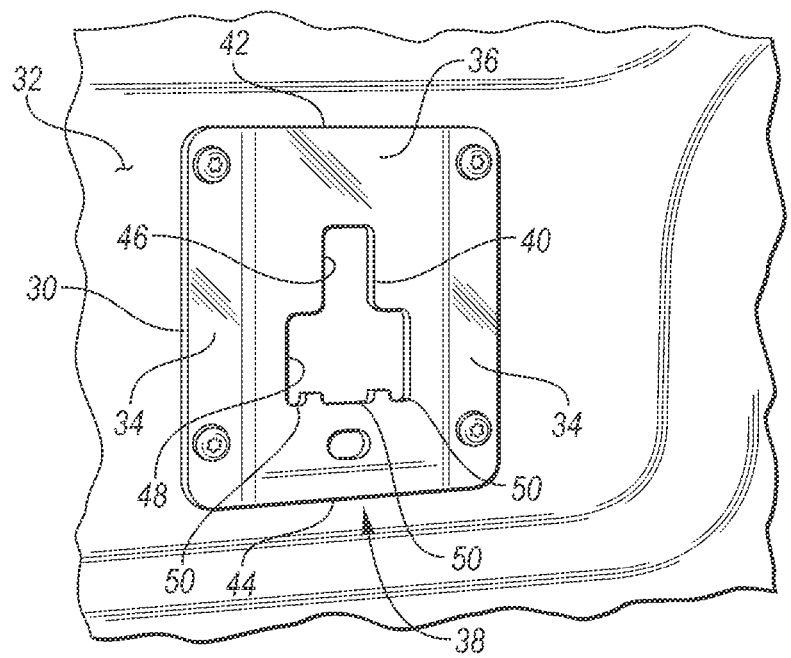
FIG. 2 is a perspective view of a fixed interface plate.

Referring to FIG. 2, an example of a fixed plate 30 is depicted. As discussed above, each of a number of fixed plates may define standard dimensions to accommodate modular connections using interchangeable components. In the example of FIG. 2, the fixed plate 30 is secured to a vertical wall 32, for example such as a side wall 18, of the cargo bed 12. The fixed plate 30 includes a pair of opposing mounting flanges 34 that are secured to the vertical wall 32 of the cargo bed. An offset section 36 is provided between, and interconnects the opposing mounting flanges 34. The offset section 36 is positioned at a distance away from the vertical wall 32 to provide a gap 38. A number of different devices can be mechanically retained to the offset section 36 by extending into the gap 38 and engaging a back surface of the offset section 36. In one example, a hole 40 is provided near a center portion of the offset section. The hole 40 may be shaped to receive a locking feature of an interfacing component on the fixed plate 30. In other examples, an interfacing component may be secured to an upper edge 42 or a lower edge 44 of the fixed plate 30.

The hole 40 functions as a keyway and includes an elongate upper portion 46 that is narrower than a lower receiving portion 48. The keyed shape of the hole 40 allows a retaining device to be inserted through the lower receiving portion 48 and slid upwardly to engage the upper portion 46. The device is horizontally constrained to the fixed plate 30 once the upper portion 46 is engaged. Additionally, a lower edge of the hole 40 defines one or more recesses 50 that are sized to correspond to holding protrusions of a retaining device. As discussed in more detail below, once an upper portion of the retaining device slidingly engages the upper portion 46 of the hole 40, a lower portion of the retaining device engages one or more of the recesses 50 to lock the retaining device to the fixed plate. The recesses 50 along the lower edge of the hole 40 function to vertically constrain the retaining device relative to the fixed plate 30.

Figure 3:
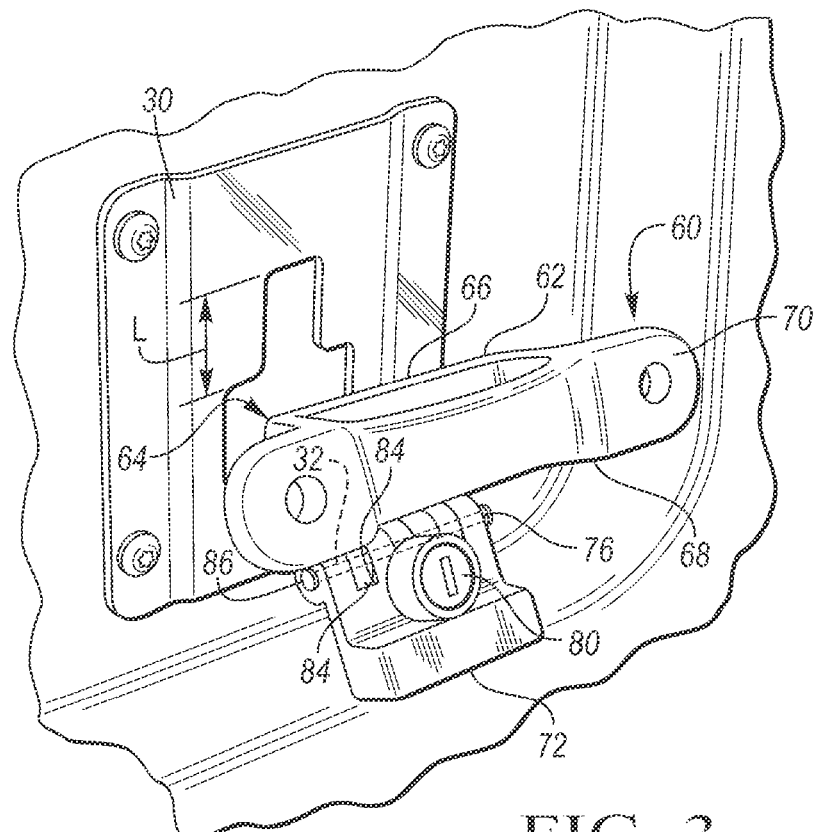
FIG. 3 is a perspective view of a removable retaining apparatus detached from a fixed interface plate.
Figure 4:
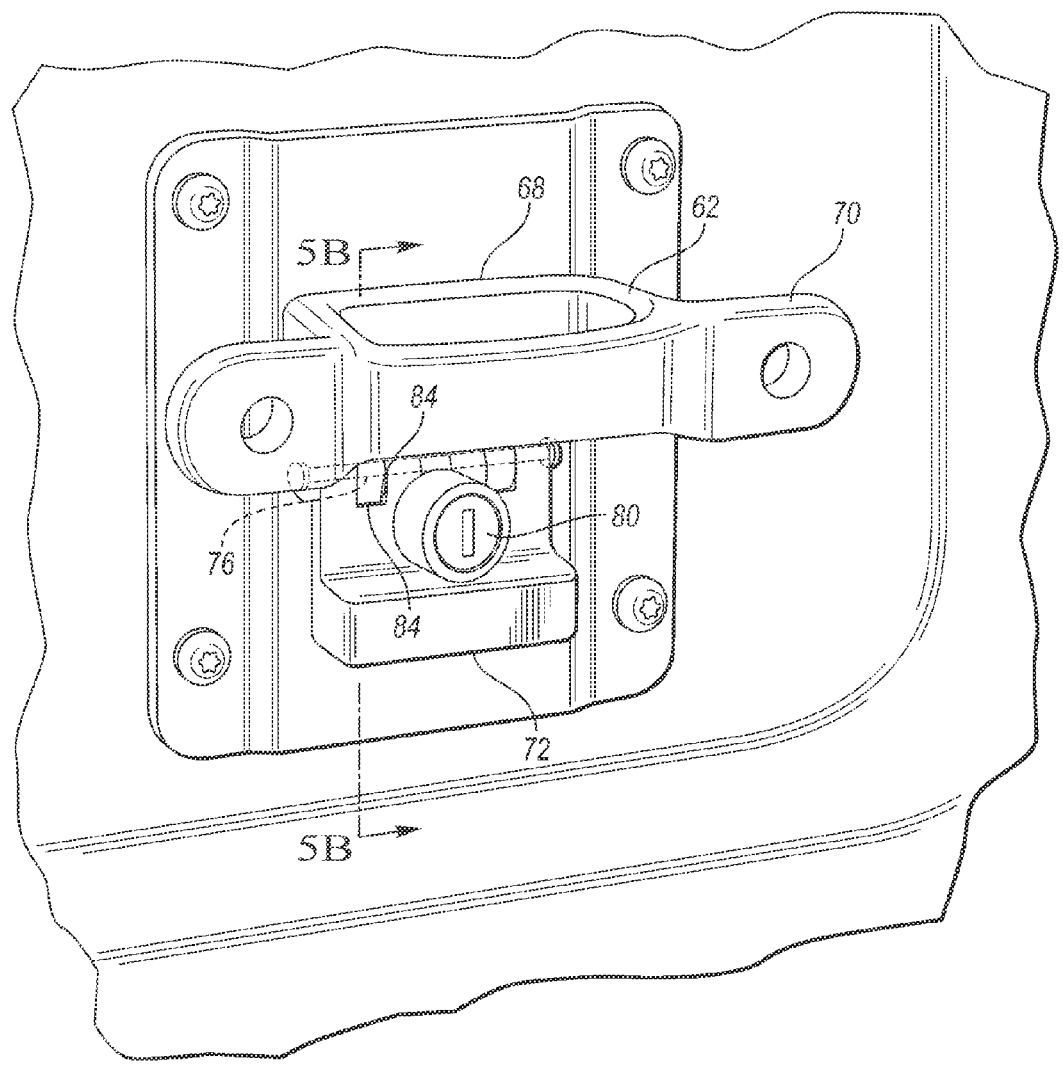
FIG. 4 is a perspective view of a removable retaining apparatus secured to a fixed interface plate.

Referring to FIGS. 3 through 5, a removable retaining apparatus 60 is illustrated that includes a base member 62 configured to engage the upper portion 46 of the keyway hole 40 as discussed above. The base member 62 includes a backing portion 64 that is inserted through the lower receiving portion 48 to protrude into the gap 38 between the offset section 36 and the vertical panel 32. The retaining apparatus slides upwardly in the direction indicated by arrow 74 with the backing portion 64 engaging a back surface of the offset section 36. The base member 62 also includes a neck portion 66 that fits within the narrow upper portion 46 of the keyway hole 40. The neck portion 66 connects the backing portion 64 to a cleat 68 on a front side of the fixed plate 30 that engages a front surface of the fixed plate. The backing portion 64 and the cleat 68 sandwich the offset section 36 of the fixed plate 30. The base member constrains movement of the retaining apparatus in a horizontal direction perpendicular to the fixed plate when the base member 62 engages the keyway 40.

The cleat 68 may include one or more tie down anchors for receiving tie-down attachments to secure cargo. The cleat 68 may define a T-shaped formation having opposing parallel horns 70 extending from a center portion. Additionally, each horn 70 may include through-holes near a distal end. Lateral loads from customer cargo tied to the cleat 68 are almost entirely transferred through the base member 62 to the fixed plate 30. The base member including the cleat is made from a strong and rigid material to withstand loads applied when tying down heavy cargo. The base member 62 including the cleat 68 may be made from a molded polymer material.

Figure 5B:
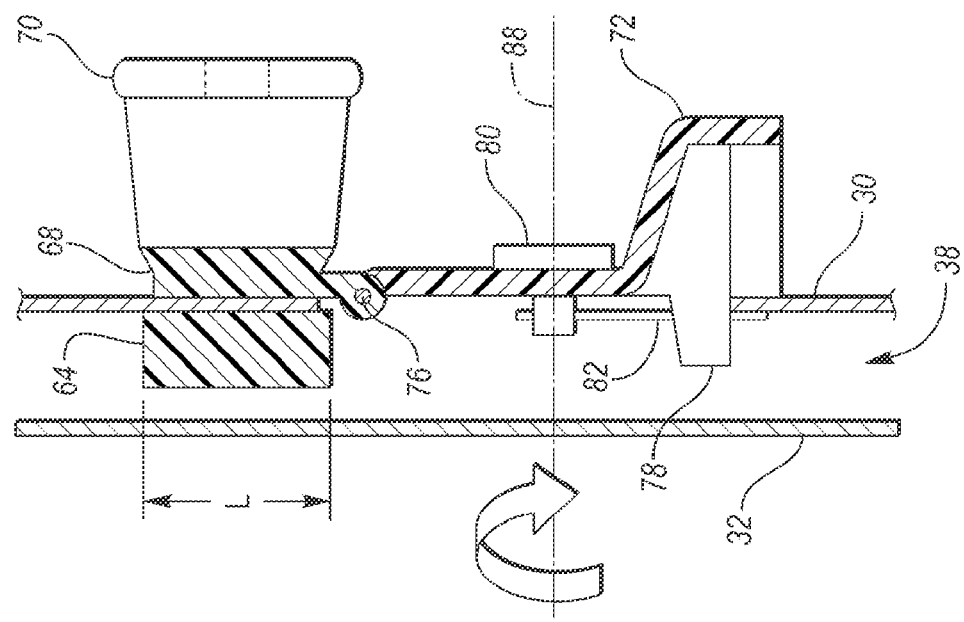
FIG. 5B is a cross section taken along line 5B-5B with the locking member in a second engaged position.
Figure 5A:
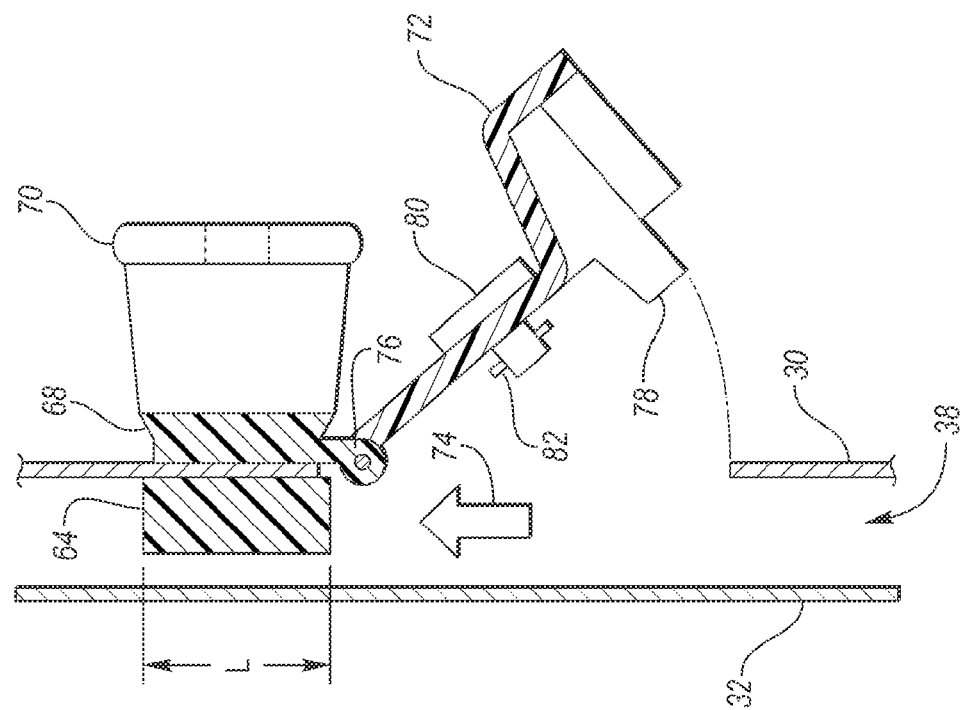
FIG. 5A is a cross section taken along line 5B-5B with a locking member in a first disengaged position.

As may be seen in FIGS. 3 and 4, the retaining apparatus 60 also includes a locking member 72 that is hingedly coupled to the base member 62. A hinge 76 is provided to allow relative movement between the locking member 72 and the base member 62. The locking member 72 is configured to pivot from a disengaged first position as shown in FIG. 5A to an engaged second position as shown in FIG. 5B to secure the retaining apparatus 60 to the fixed plate 30. The locking member 72 includes at least one protrusion 78 to engage a lower edge of the hole 40 when the locking member is in the second position. The protrusion 78 extends through the offset section 36 into the gap 38. The protrusions 78 may correspond to the location of the recesses 50 along the lower edge of the keyway hole 40 (shown in FIG. 2). Once the locking member 72 is fixed in the engaged second position, the locking member 72 constrains movement of the retaining apparatus 60 in a vertical direction parallel to the fixed plate 30.

Referring back to FIGS. 3 and 4, the hinge 76 may be a butt hinge having first half integrally molded with the base member 62, and a second half integrally molded with the locking member 72. Each of the base member 62 and the locking member 72 includes a series of barrel portions 84 interleaved with an opposing series of barrel portions 84. The interleaved barrel portions 84 are aligned along a spine of the hinge 76. A metal hinge pin 86 is provided along the spine of the hinge 76 to hold the barrel portions 84 molded from a polymer material together and define a hinge axis.

The apparatus slides a distance L to along the keyway 40 to engage the offset section 36 to provide sufficient length of engagement of the backing portion 64 and necked portion 66 with the keyway hole 40. The base member 62 must be oriented generally parallel with respect to the fixed plate 30 while sliding along the distance L to provide a snug fit sandwiching the offset section 36. The locking member 72 pivots to the disengaged first position with sufficient clearance to avoid interference between the protrusions 78 and lower portions of the offset section 36 below the hole 40. The clearance allows the retaining device to be more easily installed without undue restriction. The clearance also minimizes the need to flex the retaining apparatus 60 that would cause stresses if the device were not flexible. Such stresses could cause premature cracks or other failures during installation of the retaining apparatus.

The locking member 72 may also include additional securing features for selectively restricting the locking member from pivoting out of the engaged position. For example, a rotatable lock 80 may be attached to the locking member 72 to engage a back surface of the offset section 36 below the keyway hole 40. The rotatable lock 80 may be actuated by a key to rotate a tab 82 about an axis 88 between a locked position and an unlocked position. The rotatable locking tab 82 is elongate and is oriented generally horizontally in the unlocked position as shown in FIG. 5A so as to have no overlap to an edge of the keyway hole 40. The tab 82 is oriented generally vertically when in the locked position to overlap a lower edge of the keyway hole 40 to prevent the locking member 72 from moving out of the engaged second position.

The fixed plate 30 may be attached to a panel in any orientation within a cargo area of a vehicle. The directional references provided with respect to the example of a vertical fixed plate should not be limited to any particular orientation of a vertical fixed plate.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A cargo retention system comprising:
   a fixed plate, secured to a bed, defining an offset section; and
   a retaining apparatus having a base member, including a backing portion spaced from a cleat to sandwich a layer of and slidingly engage the section and a locking member coupled to the base member by a hinge, being pivotable from a disengaged position, having clearance from the section, to an engaged position engaging an offset section hole edge.

2. The cargo retention system of claim 1 wherein the hole in the offset section is a keyway defining an upper portion that is narrower than a lower portion of the keyway and the base member is inserted through the lower portion and slides into the upper portion.

3. The cargo retention system of claim 1 wherein the locking member includes at least one laterally extending protrusion that engages a recess formed along a lower edge of the hole in the offset section when the locking member is in the engaged position.

4. The cargo retention system of claim 1 wherein the locking member includes a rotatable locking tab that restricts the locking member from movement out of the engaged position.

5. The cargo retention system of claim 1 wherein the base member restricts movement of the retaining apparatus in a direction perpendicular to the fixed plate when engaged with the offset section, and the locking member restricts movement of the retaining apparatus in a direction parallel to the fixed plate when the locking member is in the engaged position.

* * * * *